UNITED STATES PATENT OFFICE.

HORACE W. LASH, OF CLEVELAND, OHIO.

CHARGE MIXTURE FOR IRON-SMELTING.

No. 862,978.   Specification of Letters Patent.   Patented Aug. 13, 1907.

Application filed December 20, 1905. Serial No. 292,639.

*To all whom it may concern:*

Be it known that I, HORACE W. LASH, a citizen of the United States, residing at Cleveland, in the county of Cuyahoga and State of Ohio, have invented a certain new and useful Improvement in Charge Mixtures for Iron-Smelting, of which the following is a full, clear, and exact description, reference being had to the accompanying drawings.

My invention relates to the reduction of iron oxids and consists in a suitable mixture of material for effecting such reduction.

In carrying out my invention, I use finely ground or comminuted oxid of iron, such as iron sand or scale, and mix the same with finely divided cast or pig iron and a carbonaceous material, such as coke. The several ingredients may, if preferred, receive their final comminution during the mixing process by being ground together during the mixing.

The iron oxid which I employ may be obtained from any of the ordinary sources, such as the sand ores of the St. Lawrence and New Zealand, and I find the association of such substances as titanium oxid does not interfere with the process. The only essential thing is that the iron oxid shall be in a finely divided condition in the mixture.

The cast or pig iron may be obtained from any supply convenient, but it is necessary that this addition to the mixture shall be distinctly of that quality of iron commonly designated as cast or pig iron, as distinguished from the ordinary run of scrap, wrought iron or steel, since it is important that it contain a high percentage of metalloids or oxidizable metals, such as manganese, capable of uniting with the oxygen of the ore.

The free carbonaceous material forming part of the mixture is preferably in the form of ordinary coke and is finely ground, as are the other positions of the charge mixture.

In addition to the above mentioned ingredients, I find it quite advantageous in most cases to add a readily combustible material, such as sawdust or crushed bituminous coal, which shall be consumed during the early stages of the smelting operation and thus leave the mass porous so that the smelting may proceed with greater rapidity. The combustion of the sawdust or bituminous coal is not, of course, perfect under such conditions and has the effect of coating the particles of iron oxid with carbon, and it may be that this action adds somewhat to the effectiveness of the mixture. I usually add fluxes of the ordinary kind, such as lime, silica or fluor spar, varied to suit the different grades of ore and the different conditions under which it is contemplated to smelt the mixture. It is, however, customary to add such fluxes to smelting mixtures and I do not claim any novelty for this feature of my mixture.

When it is desired that the mixture shall be handled in the form of lumps or briquets, any of the ordinary binders, such as waterglass, pitch or oil, may be employed.

When the mixture of iron oxid, pig iron and free carbon, with or without the additional substances above noted, is used as the charge for electric smelting furnaces, open-hearth furnaces, cupola furnaces, or as an addition to the ordinary open-hearth charge, or the blast furnace burden, I have found that practically the entire quantity of iron contained in the oxid, as well as the entire quantity of pig iron added, will be obtained in the molten product.

The action of the pig or cast iron in the finely divided intimate mixture is twofold in its character:—First and primarily, the pig iron contains a high percentage of metalloids and, generally, manganese, which elements, upon the fusion of the iron, are presented to the oxid in the most intimate and effective condition possible and become active and ready reducing agents. Secondly; the fused pig iron seems to act simultaneously as a solvent for some of the free carbon and as an enveloping coat for the individual particles of oxid, thus bringing such dissolved carbon into intimate association with the oxid to supplement the effect of the metalloids already contained in the pig iron, in their reducing action.

The free carbonaceous material should be present in sufficient quantity to insure the proper carburization of the smelted metal so as to maintain it in a fusible condition, and also sufficient to protect the mixture against atmospheric oxidation.

The presentation of the reducing agents to the oxids of iron through the medium of the fused metal is so effective that, although the proportions may not, owing to certain inevitable losses, be brought to the theoretical limits necessary for simple reduction of the oxids, the quantity of cast iron necessary for practical work is so small that it need never be greater than the weight of the oxid under treatment and may be considerably less, successful results having been obtained where the cast iron was not more than one fourth of the weight of the iron oxid. The quantity of free carbonaceous material used runs from about one sixth to one tenth by weight of the iron oxid, being controlled by the conditions under which the mixture is to be smelted.

In practice I have found the following proportions to produce a satisfactory mixture for smelting.

| 16.00# ore | | 12.00# ore | | 18.00# ore | |
|---|---|---|---|---|---|
| 16.00 | cast iron | 6.00 | cast iron | 7.00 | cast iron |
| 2.00 | carbon | 2.00 | carbon | 2.00 | carbon |
| .50 | lime stone | .25 | lime stone | .25 | lime stone |
| .50 | fluor spar | .25 | fluor spar | .25 | fluor spar |
| .50 | saw dust, | .50 | saw dust, | .50 | saw dust, |
| 35.50 | | 21.00 | | 28.00 | |

These proportions may, of course, be varied within obvious limits, so long as the essential characteristics outlined above appear in the resultant mixture.

Having thus described my invention, I claim:

1. A mixture of finely divided iron oxid, cast iron, and carbonaceous material, the weight of cast iron being greater than that of the carbonaceous material and less than the combined oxid and carbonaceous material.

2. A mixture of finely divided iron oxid, cast iron, carburizing material and readily combustible material.

3. A mixture comprising finely divided iron oxid, cast iron, carbon and sawdust.

4. A mixture comprising finely divided iron oxid, cast iron and carbonaceous material, the weight of the iron oxid present being at least as great as that of the cast iron.

5. A mixture comprising finely divided iron oxid, cast iron and carbonaceous material, the weight of the iron oxid present being at least as great as that of the cast iron, and the weight of the carbonaceous material being more than one tenth that of the iron oxid.

In testimony whereof, I hereunto affix my signature in the presence of two witnesses.

HORACE W. LASH.

Witnesses:
H. D. SMITH,
H. R. SULLIVAN.